United States Patent
Cooper et al.

(10) Patent No.: US 9,855,908 B2
(45) Date of Patent: Jan. 2, 2018

(54) LOAD LIMITER CONFIGURATION USING MULTIDIMENSIONAL MODEL

(71) Applicant: Tesla Motors, Inc., Palo Alto, CA (US)

(72) Inventors: John Cooper, Oxford, CA (US); Madan Gopal, Dublin, CA (US); Bruno A Luz, Loomis, CA (US); Honglu Zhang, Fremont, CA (US)

(73) Assignee: TESLA, INC., Palo Alto, CA (US)

( * ) Notice: Subject to any disclaimer, the term of this patent is extended or adjusted under 35 U.S.C. 154(b) by 11 days.

(21) Appl. No.: 14/993,368

(22) Filed: Jan. 12, 2016

(65) Prior Publication Data
US 2017/0197574 A1 Jul. 13, 2017

(51) Int. Cl.
*B60R 21/015* (2006.01)

(52) U.S. Cl.
CPC .. *B60R 21/01554* (2014.10); *B60R 21/01516* (2014.10); *B60R 21/01544* (2014.10)

(58) Field of Classification Search
CPC .. B60J 3/04; G02F 1/13306; B60R 21/01554; B60R 21/01544; B60R 21/01516
See application file for complete search history.

(56) References Cited

U.S. PATENT DOCUMENTS

| | | | | |
|---|---|---|---|---|
| 6,168,234 B1 * | 1/2001 | Haynes | | B60N 2/143 297/344.21 |
| 6,561,544 B1 * | 5/2003 | Clancy, III | | B60N 2/002 280/735 |
| 8,573,701 B2 * | 11/2013 | Yetukuri | | B60N 2/48 297/216.12 |
| 9,096,150 B2 * | 8/2015 | Cuddihy | | B60N 2/143 |
| 9,315,126 B2 * | 4/2016 | Tanner | | |
| 2006/0202452 A1 * | 9/2006 | Breed | | B60R 21/0132 280/730.2 |
| 2007/0007066 A1 * | 1/2007 | Mertz | | B60R 21/0132 180/268 |
| 2011/0024601 A1 * | 2/2011 | Shoemaker | | B60N 2/501 248/636 |
| 2011/0133439 A1 * | 6/2011 | Pearce | | B60R 22/28 280/805 |

(Continued)

FOREIGN PATENT DOCUMENTS

| JP | 2008192895 A | * | 8/2008 | | H05K 3/361 |
|---|---|---|---|---|---|
| JP | 2010038913 A | * | 2/2010 | | |

*Primary Examiner* — Tuan C. To
(74) *Attorney, Agent, or Firm* — Garlick & Markison; Bruce E. Garlick

(57) ABSTRACT

A method includes: determining first and second row seat values using seat sensors; generating relative position data for the seats using the values; selecting a load limiter setting value using the relative position data and a multidimensional load limiter model including at least i) body impact values as a function of at least load limiter setting values and as a function of relative position values, and ii) restraint interaction values as a function of at least the load limiter setting values and as a function of the relative position values, the load limiter setting value selected so that the load limiter setting value is outside a first value avoidance zone defined for the body impact values, and outside a second value avoidance zone for the restraint interaction values; and configuring a second row restraint system in the vehicle with the selected load limiter setting value.

20 Claims, 7 Drawing Sheets

(56) References Cited

U.S. PATENT DOCUMENTS

| | | | |
|---|---|---|---|
| 2015/0137492 A1* | 5/2015 | Rao | B60R 21/017 |
| | | | 280/729 |
| 2015/0137564 A1* | 5/2015 | Cuddihy | B60N 2/203 |
| | | | 297/94 |
| 2015/0251627 A1* | 9/2015 | Kohlndorfer | B60R 22/3413 |
| | | | 242/379.1 |
| 2016/0059813 A1* | 3/2016 | Neal | B60W 40/08 |
| | | | 701/45 |
| 2016/0129868 A1* | 5/2016 | Choi | B60R 21/013 |
| | | | 280/735 |
| 2016/0272141 A1* | 9/2016 | Ohmura | B60R 21/01554 |
| 2017/0120851 A1* | 5/2017 | Garcia Gomez | B60R 21/0136 |
| 2017/0144621 A1* | 5/2017 | Rao | B60R 21/01516 |
| 2017/0166094 A1* | 6/2017 | Frye | B60N 2/123 |

* cited by examiner

LOAD LIMITER CONFIGURATION USING MULTIDIMENSIONAL MODEL

BACKGROUND

Restraint systems such as seat belts are required in vehicles to improve occupant safety in the event of a crash or other accident. Vehicles are designed to accommodate passengers of various sizes and ages, whose height and body weight can vary considerably from each other. These varying factors can affect the restraint system performance and the use thereof in multiple ways. For example, a tall, heavy person places a greater load on the restraint system during deployment than a short, lighter person. On the other hand, a person with a small body, such as a child, may be relatively more sensitive to the impact of the restraint system in the deployment, for example regarding the force from the seat belt as the passenger is being restrained.

SUMMARY

In a first aspect, a method of configuring a load limiter in a second row of a vehicle where each of a first row seat and a second row seat is fore/aft adjustable comprises: determining a first row seat value using a first seat sensor on the first row seat; determining a second row seat value using a second seat sensor on the second row seat; generating relative position data for the first and second row seats using the first and second row seat values; selecting a load limiter setting value using the relative position data, the load limiter setting value selected using a multidimensional load limiter model including at least i) body impact values as a function of at least load limiter setting values and as a function of relative position values, and ii) restraint interaction values as a function of at least the load limiter setting values and as a function of the relative position values, the load limiter setting value selected so that the load limiter setting value is outside a first value avoidance zone defined for the body impact values, and outside a second value avoidance zone for the restraint interaction values; and configuring a second row restraint system in the vehicle with the selected load limiter setting value.

Implementations can include any or all of the following features. The multidimensional load limiter model also depends on occupant weight, the method further comprising determining an occupant weight value for an occupant in the second row seat, and taking into account the occupant weight value in selecting the load limiter setting value. The multidimensional load limiter model depends on occupant weight categories, the method further comprising determining which of the occupant weight categories comprises the occupant weight value. The occupant weight categories include corresponding percentile values relative to a reference population. The load limiter setting value includes a force value, and wherein configuring the second row restraint system comprises setting a load limiter therein to perform belt payout when a force on the second row restraint system is approximately equal to the force value. The first row seat value includes a first fore/aft position value. The second row seat value includes a second fore/aft position value. At least one of the first and second row seat values includes a lift height value. At least one of the first and second row seat values includes a back recline position value. At least one of the first and second row seat values includes a tilt position value. At least one of the first and second row seat values includes a pitch position value. The pitch position value is for the second row seat in its entirety and whether a backrest of the second row seat is non-reclining. At least one of the first and second row seat values includes a lumbar support value. The lumbar support value reflects a lumbar support horizontal position. The lumbar support value reflects a lumbar support vertical position. At least one of the first and second row seat values includes a headrest position value. The first value avoidance zone comprises the body impact criterion values being above a limit. The first value avoidance zone further comprises the body impact criterion values indicating expected body contact with the first row seat. The second value avoidance zone comprises the restraint interaction values being above a limit. The multidimensional load limiter model takes into account crash severity, and wherein a crash severity value is used in selecting the load limiter setting value.

DETAILED DESCRIPTION

Figure 1:
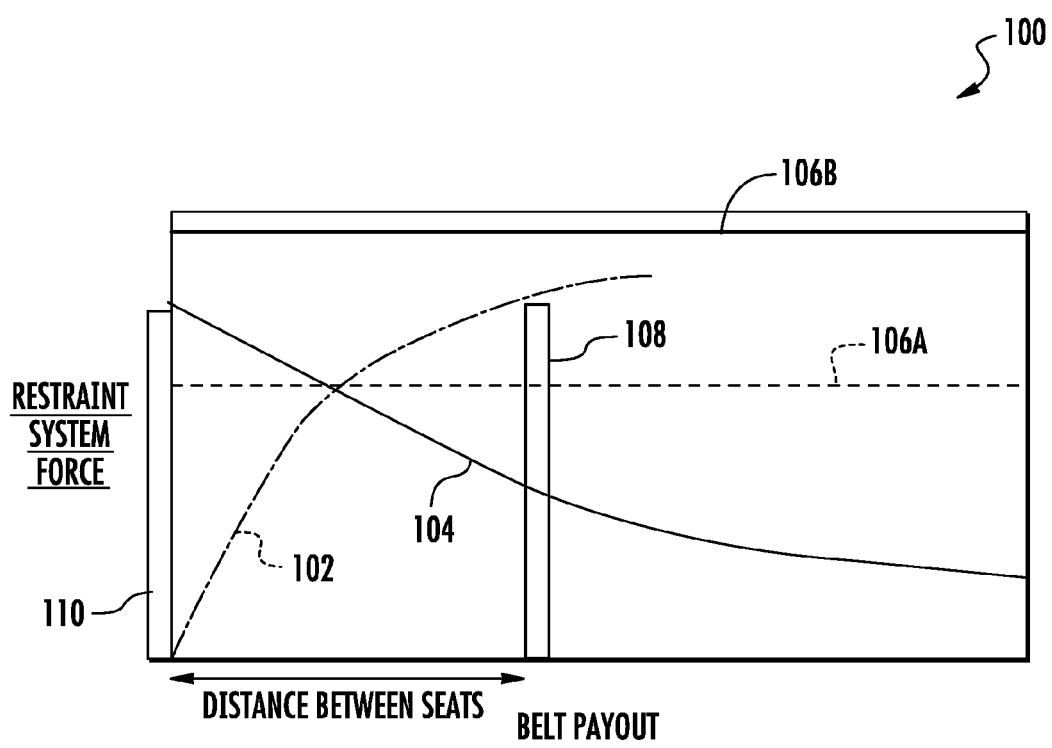
FIG. 1 schematically shows an example of a graph of restraint system force and belt payout in a load limiter.

This document describes examples of systems and techniques for configuring a restraint control system in a vehicle. The system can have a load limiter feature designed to limit the load that a restraint device exerts on a seat occupant during deployment of the restraint device, which can be a three-point seat belt, for example. As another example, the system can have four points with separate load limiters to control each element independently. In particular, the restraint control system can be configured so that it strikes a beneficial balance between, on the one hand, a concern regarding body impact, and on the other hand a concern regarding the impact on the occupant of the restraint device itself. Moreover, this configuration can be made essentially in real time depending on a number of variable factors that affect these concerns. In some implementations, a system can take advantage of most or all of the room available between second row occupants and the front seat in different crash situations (e.g., depending on directionality, severity, etc.) For example, if the front seat is very close to the rear occupant, the retractor may not allow extra webbing to pay out; on the other hand, if there is enough room for excursion, the retractor can allow more webbing payout to make the ride down softer while reducing or avoiding front seat contact altogether. These features in turn can further be tuned to adapt to seated occupant classification. This can produce a better balance between head and chest protection in a larger range of real world cases. All results described herein come from simulations as opposed to actual testing.

Examples regarding load limiters in the second row of seats are described herein only for illustrative purposes. In other implementations, the load limiter can relate to a seat in another row, including, but not limited to, an adjustable first-, third- or fourth-row seat, etc.

Some implementations can provide a variable load limiter retractor for second row seats that self-adjusts the load limiting value according to the combined position of the front row seat and second row seat. For example, separate sensors in the front and rear seat tracks can send signals to a passive safety restraint control module. Based on the combined seat track position a control algorithm can determine a load limiting value for the second row seat retractor and therefore the belt payout that will be applied. For example, when the seat track sensors indicate that the second row seat and first row are close to each other the seat belt retractor load level can be increased to a level that prevents head contact by the second row occupant with the rear of the front seat. On the other hand, when the seat track sensors show that there is a large distance between the front and second row seat the load limit can be decreased to a lower level to reduce chest loading and deflection while still preventing head contact with the rear of the front seat. In addition the level of load-limiter can further be optimized to reduce chest loads that are able to be managed by respective occupant (as defined by the classification).

Some countries or regions have introduced requirements to increase the occupant protection in the second row of vehicles. Some of these requirements focus on a $5^{th}$ percentile passenger, with one set of seat positions. To achieve good performance these requirements may necessitate the introduction of a seat belt load limiter. If a seat belt system were tuned to only these seating positions the system performance in real world conditions could create unwanted results, such as head contact with the rear of the front seat (or higher chest loads). Therefore second row occupant safety can give rise to a variety of possible situations involving different occupant sizes and different front and second row seat locations.

FIG. 1 schematically shows an example of a graph 100 of restraint system force and belt payout in a load limiter. The load limiter is a functionality that is applied to the seat belt system as part of the restraint system in a vehicle. In some implementations, the seat belt system can have a seatbelt retractor device and the load limiter can be part of that device. Such a retractor can be located in the vehicle body (e.g., in the B-pillar) or in the seat itself (e.g., inside the backrest). For example, the seatbelt retractor can also have a pre-tensioner function that in the event of a crash removes seatbelt slack and thereby provides an earlier belt loading or cinches the occupant rearward.

The load limiter, then, can specify how much of the webbing in the seatbelt should be paid out as a function of the occupant load on the seatbelt. In this figure, the restraint system force that the occupant applies to the seatbelt is shown on the vertical axis. The corresponding belt payout, moreover, is shown on the horizontal axis. A curve 102 schematically shows the relationship between the restraint system force and the belt payout. The curve can be measured in any unit of force (e.g., on the order of thousands of Newtons). For example, the payout increases with the load but as the load increases, more and more belt is paid out. Eventually, the load/payout curve becomes essentially planar, meaning that regardless of the force applied, the belt webbing keeps paying out. That is, this curve indicates that the load on the occupant's body due to the restraint system will not exceed a certain threshold value.

Before the seatbelt reaches significant payout, however, a certain force is applied to the occupant by the restraint system. In seatbelt systems that have a shoulder belt going across the occupant's body, this is sometimes referred to as a chest acceleration value, in accordance with the general relationship between force and acceleration. Moreover, to the extent a crash test dummy is equipped to measure the amount that the dummy ribcage is compressed as a result of the force, this value is sometimes referred to as a chest deflection value, which is here represented by a curve 104. This curve is measured in a different unit, say, millimeters. That is, before the seatbelt pays out to a significant amount, the load is carried by the occupant's body, which is reflected in a relative high value on the curve 104. When the belt webbing starts paying out, on the other hand, this causes the chest deflection to be reduced, and the curve 104 reflects this as well.

That is, the benefit of belt payout is that as the belt webbing pays out the chest deflection goes down, as indicated by the curve 104. In the lower left area of the graph, the restraint system is trying to reduce the overall motion of the occupant body, so significant amounts of load are being applied to that effect. However, this can cause chest deflection to be relatively high, as indicated. On the other hand, as the belt pays out, the deflection begins to go down; however, one consequence of this is that the acceleration on the occupant body goes up. That is, the more force that is applied, the more acceleration is reduced but deflection is higher. On the other hand, if the force is reduced, the acceleration increases. Accordingly, achieving a balance design can result in an optimized performance.

One or more load limiters 106A-B can be defined so as to be selectable in the restraint system. Selecting a load limiter among those available is done to tailor the restraint system based on the applicable circumstances. Here, each load limiter is schematically represented as a horizontal line measured against the restraint system force axis. Solely for illustrative purposes, a first load limiter 106A is here shown that can correspond to a value of about 1-3 kN; similarly, a second load limiter 106B can correspond to a value of about 5-7 kN. That is, these values signify that the first load limiter will start paying out the seatbelt at a load of about 1-3 kN, whereas the second load limiter will be paying out the seatbelt at a load of about 5-7 kN.

Which of multiple load limiters should be applied can be selected based on which of them best configures the restraint system under the particular circumstances. In some implementations, this depends on the occupant weight and also on the available distance to a structure in front of the occupant. For example, a first row seat 108 and a second row seat 110 are here schematically illustrated, with a distance between seats being a relative measurement relating to their respective positions. If relatively little space is available for deceleration, then the higher impact of restraint load may be preferable rather than have the occupant's body make contact with the seat in front (e.g., the first row seat). On the other hand, if relatively much space is available, then a lower load limiter can reduce the occupant body motion sufficiently, given that the likelihood of body contact with the seat in front is reduced.

Figure 2:
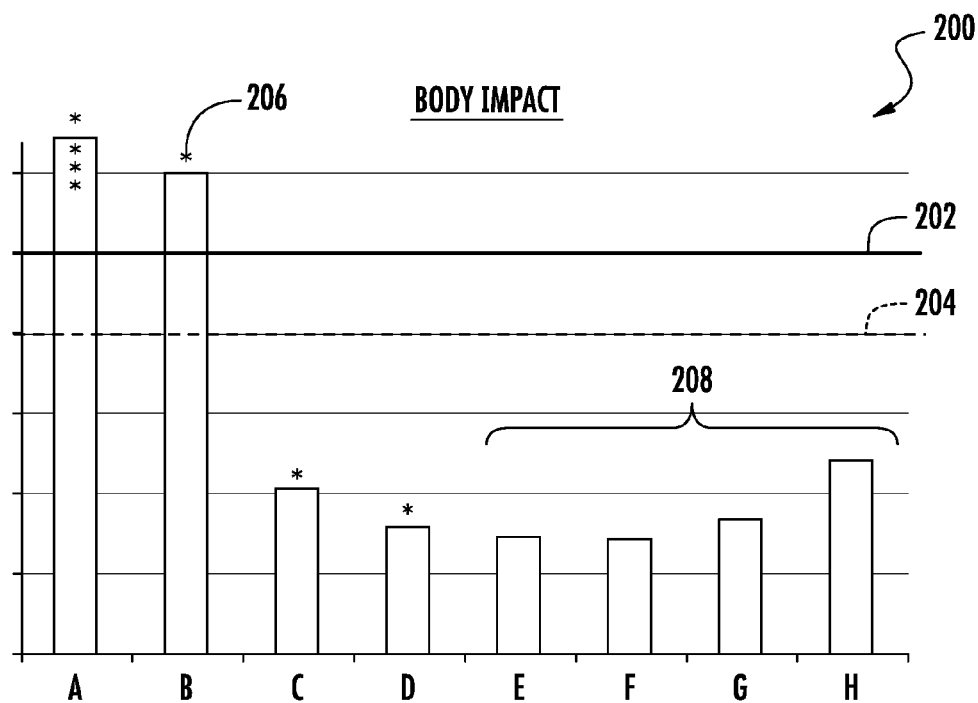
FIG. 2 shows an aspect of a multidimensional load limiter model with body impact values and load limiter setting values.

FIG. 2 shows an aspect of a multidimensional load limiter model 200 with body impact values and load limiter setting values. This exemplary graph illustrates body impact values that were obtained by simulation based on a particular occupant weight (such as a specific percentile categorization) and a certain relative spacing between the second and first row seats. The expected body impact values are here measured against the vertical axis whereas the different load limiter settings are referred to as A, B, . . . , H, respectively, on the horizontal axis. The body impact values can be measured in an arbitrary unit that signifies the amount (if any) of impact by at least some part of the dummy's body (e.g., the head) as a result of a crash. The higher the value, the more impact on the dummy's body.

A line 202 corresponds to a limit for the body impact values. For example, this can be set by statute or regulation or rating in a particular country. A line 204, on the other hand, can be a target set for the design of a particular restraint system. Bullets 206, moreover, indicate that the dummy in that situation (that is, with the particular load limiter under the given circumstances) would be expected to have sustained body contact with the forward seat. For load limiter settings 208, on the other hand, the body impact values are below both the limit and the target (lines 202 and 204) and also did not have actual body impact.

Figure 3:
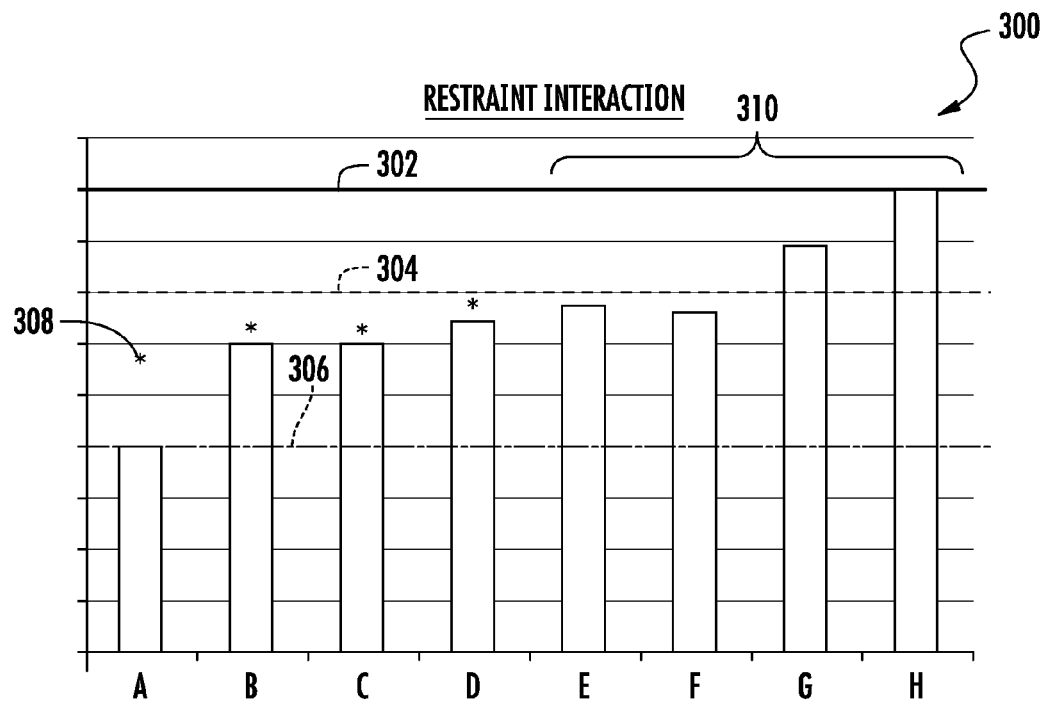
FIG. 3 shows an aspect of a multidimensional load limiter model with restraint interaction values and load limiter setting values.

FIG. 3 shows an aspect of a multidimensional load limiter model 300 with restraint interaction values and load limiter setting values. This exemplary graph illustrates body impact values that were obtained by simulation based on a particular occupant weight (such as a specific percentile categorization) and a certain relative spacing between the second and first row seats. The restraint interaction values are here measured against the vertical axis whereas the different load limiter settings are referred to as A, B, . . . , H, respectively, as in the previous example. The restraint interaction values can be measured in an arbitrary unit that signifies the amount (if any) of interaction with (e.g., deflection by) at least some part of the dummy's body (e.g., the chest) as a result of a crash. The higher the value, the more interaction with the dummy's body.

A line 302 corresponds to a limit for the body impact values. For example, this can be set by statute or regulation or rating in a particular country. A line 304, on the other hand, can be a target set for the design of a particular restraint system. A line 306, finally, can represent a level that corresponds to a particular rating by a testing organization. Bullets 308 indicate that the dummy in that situation (that is, with the particular load limiter under the given circumstances) would be expected to have sustained body contact with the forward seat. For load limiter settings 310, on the other hand, the body impact values are below the limit (line 302) and also did not have actual body impact.

Figure 4:
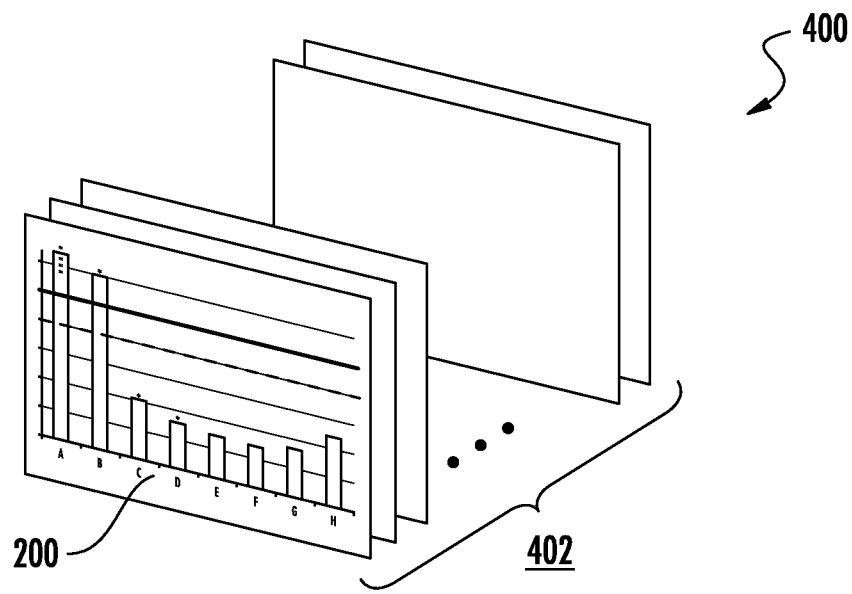
FIG. 4 schematically shows an example of a multidimensional load limiter model.

FIG. 4 schematically shows an example 400 of a multidimensional load limiter model. The multidimensional load limiter model includes the exemplary two-dimensional aspect 200 for expected body contact that was discussed above, and as mentioned that graph corresponds to a simulation based on a particular occupant weight and a certain relative spacing between the second and first row seats. The model in its entirety, moreover, can include information regarding many different occupant weights, and many different relative positions between seats. Accordingly, the model is regarded as having more dimensions than two. For example, an additional dimension 402 can represent a distribution over occupant weight or stature values. For example, an on-board camera (e.g., an infra-red detector) can assess the occupant's stature. As another example, the additional dimension 402 can represent a distribution over relative seat separation values. Accordingly, this example illustrates that occupant weight can be taken into account in selecting a load limiter setting value.

Figure 5:
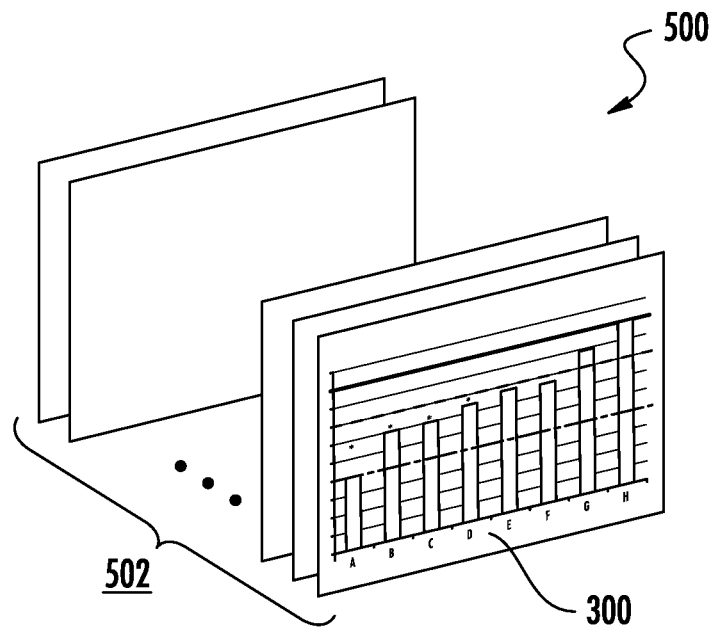
FIG. 5 schematically shows another example of a multidimensional load limiter model.

FIG. 5 schematically shows another example 500 of a multidimensional load limiter model. The multidimensional load limiter model includes the exemplary two-dimensional aspect 300 for restraint interaction that was discussed above, and as mentioned that graph corresponds to a simulation based on a particular occupant weight and a certain relative spacing between the second and first row seats. For example, an additional dimension 502 can represent a distribution over occupant weight values. As another example, the additional dimension 502 can represent a distribution over relative seat separation values. Accordingly, this example illustrates that occupant weight can be taken into account in selecting a load limiter setting value. In some implementations, the multidimensional load limiter model depends on categories of occupant weight. For example, the occupant weight categories can include respective percentile values relative to a reference population.

As indicated in the above examples, the model can contain a range of load limited setting values and corresponding simulation-based values characterizing the restraint system for each load limiter. Moreover, in particular circumstances one or more load limiters can be inappropriate or less desirable to use. For example, this can be because a regulatory or rating limit is exceeded or because body contact would be expected to be sustained for a particular size of dummy and/or relative seat separation. As such, to the extent load limiter settings are dynamically assigned to the restraint system of a vehicle, it can be desirable to avoid certain values from the model for these reasons.

Figure 6:
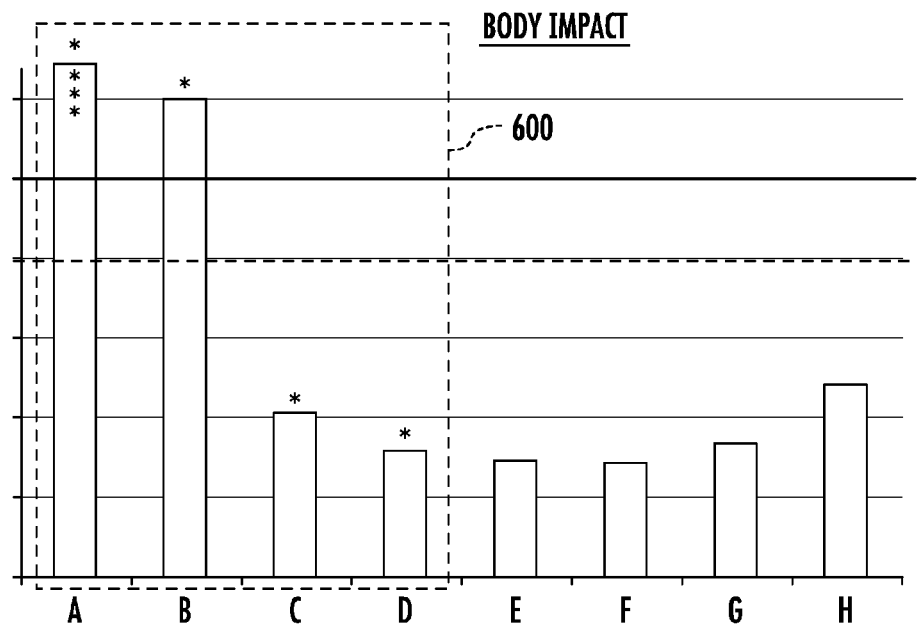
FIG. 6 shows an example of a value avoidance zone in a multidimensional load limiter model.

FIG. 6 shows an example of a value avoidance zone 600 in a multidimensional load limiter model. This can be the multidimensional load limiter model that was exemplified earlier regarding body impact values. For example, the value avoidance zone 600 can be defined based on the interest in selecting load limiters that do not exceed the defined limit or target (i.e., that have values low enough). As another example, the value avoidance zone 600 can be defined based on the interest in selecting load limiters that do not create expected body contact (i.e., that have values without a bullet). The zone can be defined as part of the model itself, or as part of a dynamic functionality that accesses the model for purpose of selecting a load limiter value.

Figure 7:
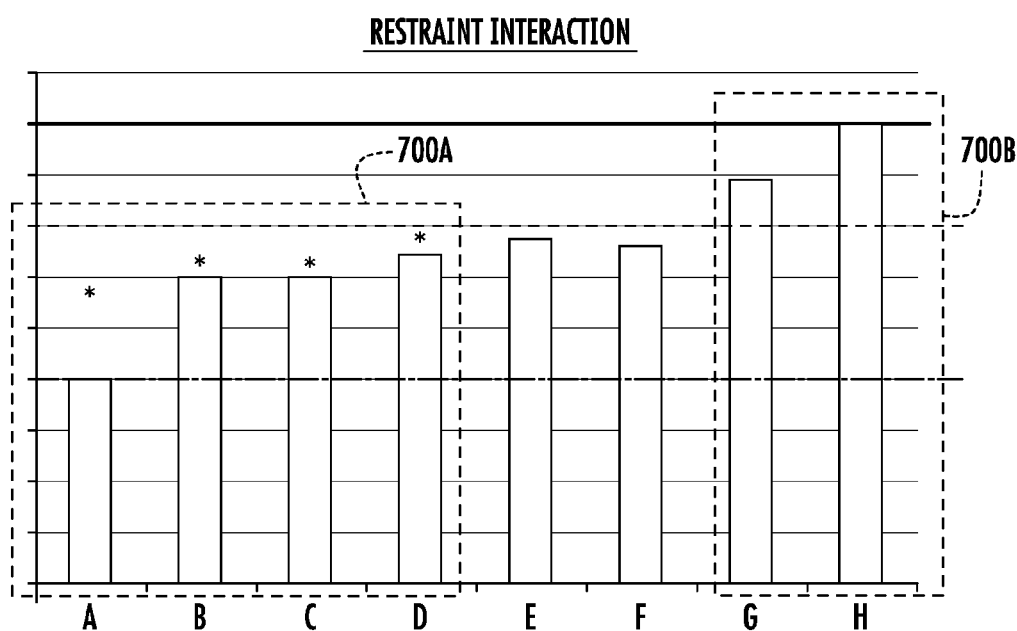
FIG. 7 shows another example of a value avoidance zone in a multidimensional load limiter model.

FIG. 7 shows another example of a value avoidance zone 700A-B in a multidimensional load limiter model. This can be the multidimensional load limiter model that was exemplified earlier regarding body impact values. For example, the value avoidance zone 700 can be defined based on the interest in selecting load limiters that do not create expected body contact (i.e., that have values without a bullet), such as with the zone 700A. As another example, the value avoidance zone 700 can be defined based on the interest in selecting load limiters that do not exceed the defined limit or target (i.e., that have values low enough), such as with the zone 700B. The zone can be defined as part of the model itself, or as part of a dynamic functionality that accesses the model for purpose of selecting a load limiter value.

Figure 8:
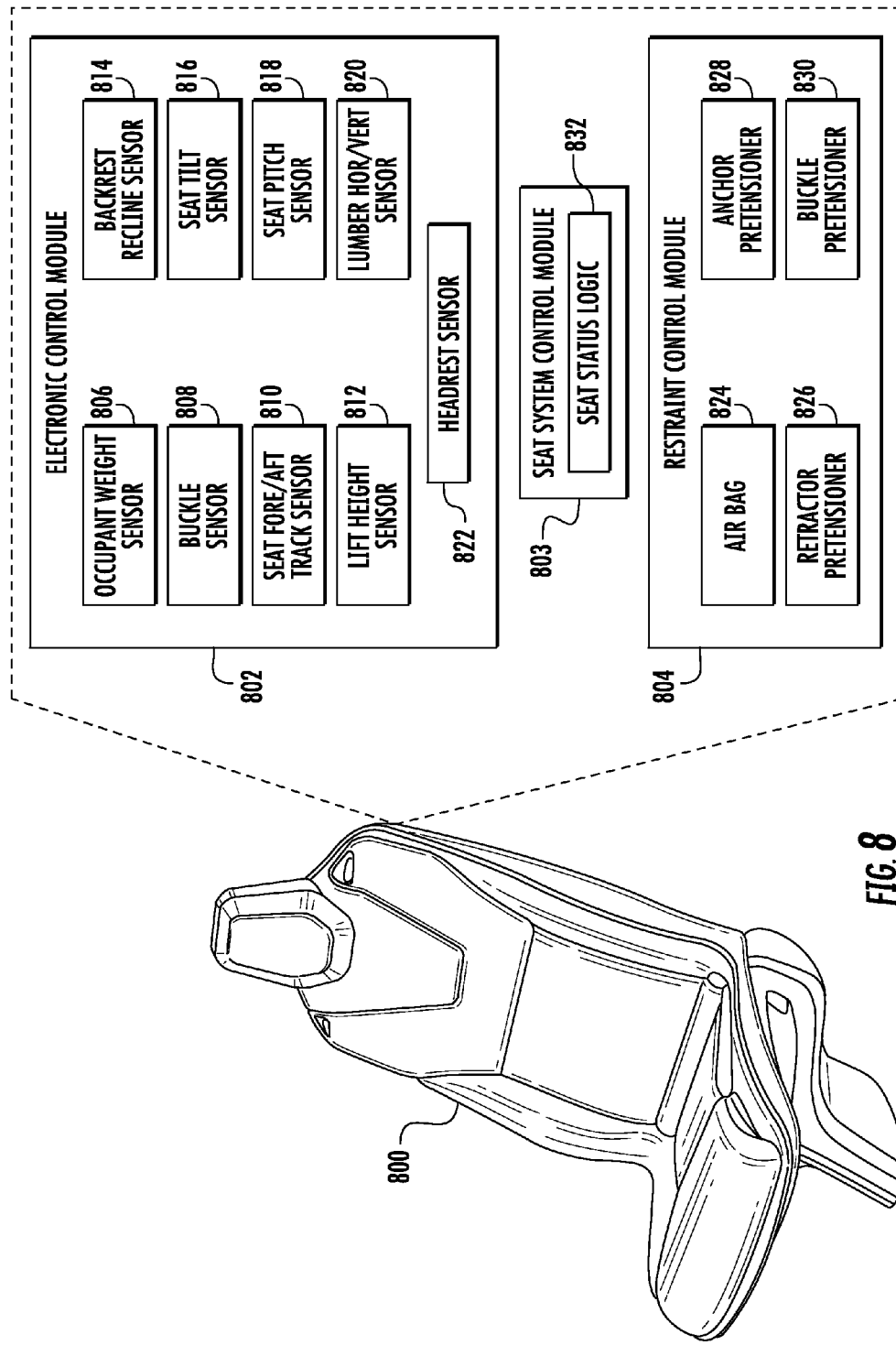
FIG. 8 shows an example of a seat.

FIG. 8 shows an example of a seat 800. The seat can be used in the first row of a vehicle, or in a second or subsequent row. In some implementations, the seat is a freestanding seat configured to be selectively positioned along one or more tracks in the vehicle floor, as well as to be adjusted in other regards. For example, a freestanding seat can have a restraint system (e.g., seat belt and airbag) integrated in the seat. For the above or other purposes, the seat can have control circuitry, encoders or other sensors, as well as motors or actuators that effectuate seat adjustment. For example, control of the seat and detection of adjustments can be managed by an electronic control module 802. The seat system can be controlled using a module 803, which can be implemented separately or as a part of the electronic control module 802, to name just two examples. The restraint system, moreover, can be controlled by a restraint control module 804. Each of these modules can be implemented, individually or as a common unit, using a suitable combination of hardware, firmware and software.

The electronic control module 802 here includes an occupant weight sensor 806. In some implementations, this sensor registers the weight of the occupant using a device positioned in the seat cushion. For example, the weight can be categorized using a system of weight categories (e.g., percentiles).

The electronic control module 802 here includes a buckle sensor 808. In some implementations, this sensor is positioned in the buckle of the seat belt system. For example, the sensor signal can indicate whether the seatbelt is buckled.

The electronic control module 802 here includes a seat fore/aft track sensor 810. In some implementations, this sensor is positioned on or near a track on which the seat base is positioned. For example, an encoder can register seat movement for or aft and can therefore report the current position of the seat.

The electronic control module 802 here includes a lift height sensor 812. In some implementations, this sensor is positioned on or near a lift mechanism that allows the occupant to adjust the height of the seat. For example, the height of one seat can affect the relative distance between that seat and another one, and this measurement can be detected, such as using an encoder.

The electronic control module 802 here includes a backrest recline sensor 814. In some implementations, this sensor is positioned on or near a backrest hinge mechanism that allows the occupant to adjust the recliner of the backrest. For example, the recliner of the backrest can affect the relative distance between that seat and another one, and this measurement can be detected, such as using an encoder.

The electronic control module 802 here includes a seat tilt sensor 816. In some implementations, this sensor is positioned on or near a tilting mechanism that allows the occupant to adjust the tilt of the seat base and/or the seat cushion. For example, the tilt of the seat base/cushion can affect the relative distance between that seat and another one, and this measurement can be detected, such as using an encoder.

The electronic control module 802 here includes a seat pitch sensor 818. Some implementations involve a seat without reclining backrest, wherein the seat can instead be pitched in its entirety in directions fore and aft in the vehicle. In such implementations, this sensor is positioned on or near the pitching mechanism. For example, this measurement can be detected using an encoder.

The electronic control module 802 here includes a lumbar horizontal/vertical sensor 820. In some implementations, this sensor is positioned on or near a lumbar support mechanism that allows the occupant to adjust a lumbar support horizontally and/or vertically. For example, this measurement can be detected, such as using an encoder.

The electronic control module 802 here includes a headrest sensor 822. In some implementations, this sensor is positioned on or near a headrest adjustment mechanism that allows the occupant to adjust a headrest horizontally and/or vertically. For example, this measurement can be detected, such as using an encoder.

The restraint control module 804, in turn, can include one or more air bags 824. In some implementations, the air bag can be positioned inside the seat and configured to emerge therefrom when deployed. For example, the air bag can be located in a portion of the seatback.

The restraint control module 804 can include a retractor pre-tensioner 826. In some implementations, this component can be positioned inside the seatback and hold the seatbelt webbing that is fed out through an opening near the occupant's shoulder. For example, the component can serve to apply pretension to the seatbelt in the event of a crash.

The restraint control module 804 can include an anchor pre-tensioner 828. In some implementations, this component can be positioned at the anchor of the seatbelt, such as on the outer lower frame of the seat structure. For example, the component can serve to apply pretension to the seatbelt in the event of a crash.

The restraint control module 804 can include a buckle pre-tensioner 830. In some implementations, this component can be positioned at the buckle of the seatbelt system, such as on the inner lower frame of the seat structure. For example, the component can serve to apply pretension to the seatbelt in the event of a crash.

In some implementations, information from a belt webbing sensor can be provided to the electronic control module. For example, this can indicate the length of the belt webbing that is being paid out, and/or the rate of payout.

The seat system control module 803 can include seat status logic 832. In some implementations, the module 803 takes input from the electronic control module 802 and provides status input to the restraint control module 804. For example, the module 804 can then combine the input with information about a crash severity to select the appropriate level of load limiter.

In some implementations, not all of the above components are included in the same seat. For example, a first row seat can have a reclining backrest and a lift function, whereas a second row seat can be non-reclining and have only fore/aft and pitch adjustments available. Other combinations can be used.

Figure 9:
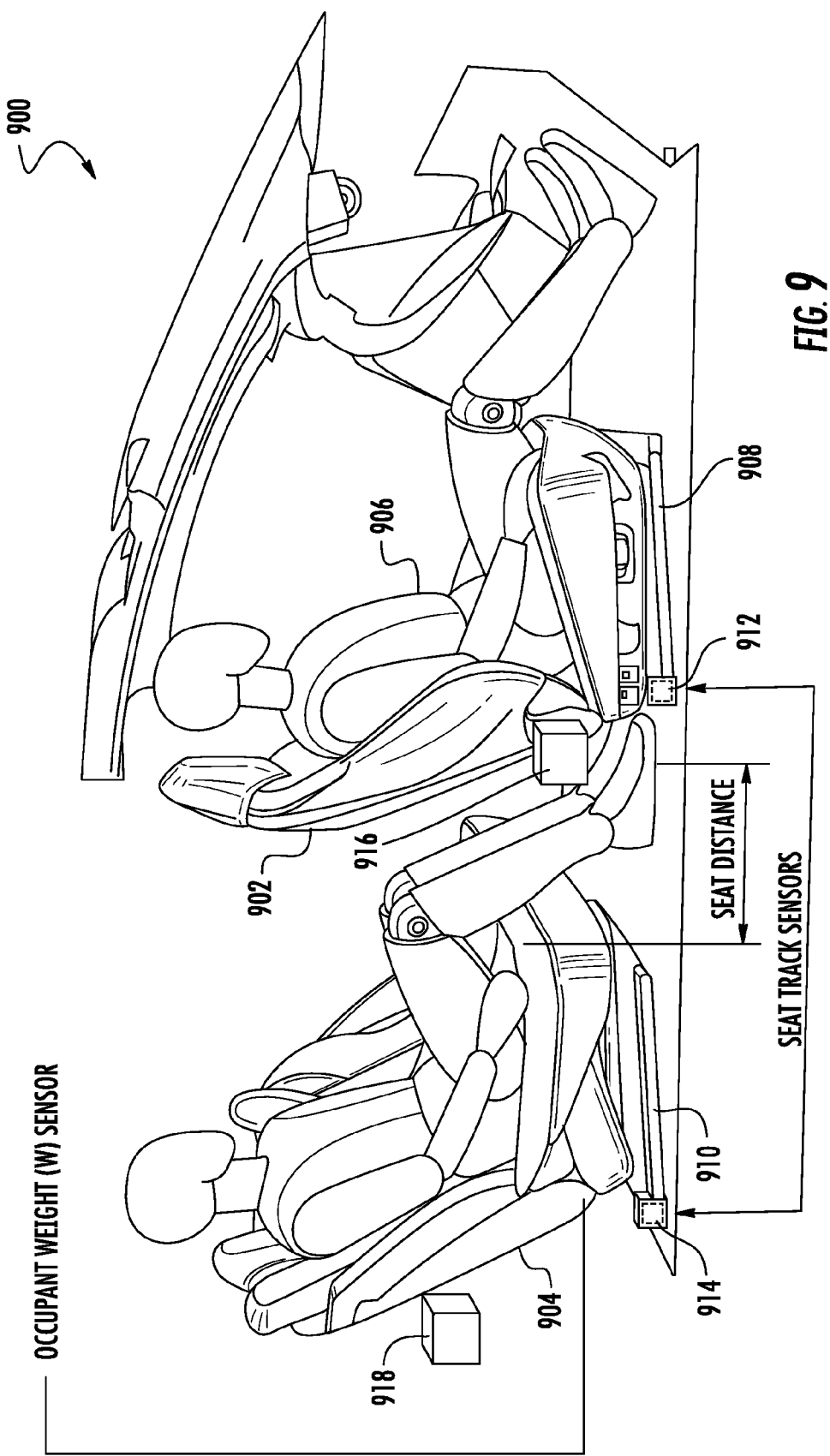
FIG. 9 schematically shows an example of a vehicle with a first row seat and a second row seat.

FIG. 9 schematically shows an example of a vehicle 900 with a first row seat 902 and a second row seat 904. This illustration represents a simulation of the use of a restraint control system and therefore includes dummies 906 in the first and second row seats.

Each seat is situated on a corresponding track for at least fore/aft movement. Here, a track 908 is used for the first row seat and a track 910 is used for the second row seat. In some implementations, these fore/aft adjustment systems are different from each other. For example, the track for the first row seat can be located on top of the interior floor of the vehicle (albeit possibly hidden under the vehicle seat cushion). As another example, the track for the second row seat can be located underneath the interior floor, such that the seat is suspended by a monopost extending through a slot in the floor that accommodated fore/aft movement.

One or more sensors can be provided for each seat. For example, a track sensor 912 is here used for the first row seat and a track sensor 914 is used for the second row seat. For example, the sensors include encoders that count relative movement fore/aft of each seat. Such encoder values can then be converted into an absolute fore/aft value for each seat. For example, when the track system nominally allows N millimeter of travel for the seat, the absolute fore/aft value can then be expressed as a value n that is between zero and N. Other sensor data can also reflect the positioning of a seat. Accordingly, more than one type of sensor data can be taken into account in choosing a load limiter setting value.

Two or more setting values for the seats can be converted into a relative value for those seats. In some implementations, the respective fore/aft seat values can be used. For example, the current fore/aft value for each of the first and second row seats is known because the control system of each seat tracks this data and can report it to a central module (e.g., a vehicle controller) or can share the data with other components on the same bus. The physical dimensions of each seat are also known, for example how far the second row seat extends forward of its track position sensor, and how far the first row seat extends rearward of its track position sensor. These and other physical characteristics can then be taken into account when determining relative position data for the seat.

The determined data can reflect the relative position between the seats in any of multiple ways. For example, the currently smallest physical separation between any part of the second row seat and any part of the first row seat can be determined. As another example, the current physical separation between respective predefined parts of the second row seat and the first row seat can be determined. Other determinations regarding the relative positions of the seats, taking into account any or all of the sensor signals or other measurements/characteristics available in the system, can be performed.

Each seat can have a dedicated load limiter. Here a load limiter 916 for the first row seat and a load limiter 918 for the second row seat are schematically illustrated. For example, the load limiter functionality can be implemented in a retractor component of the respective restraint system, so that the selective payout of seatbelt webbing in the event of a crash can be controlled in accordance with the setting of the load limiter.

Figure 10:
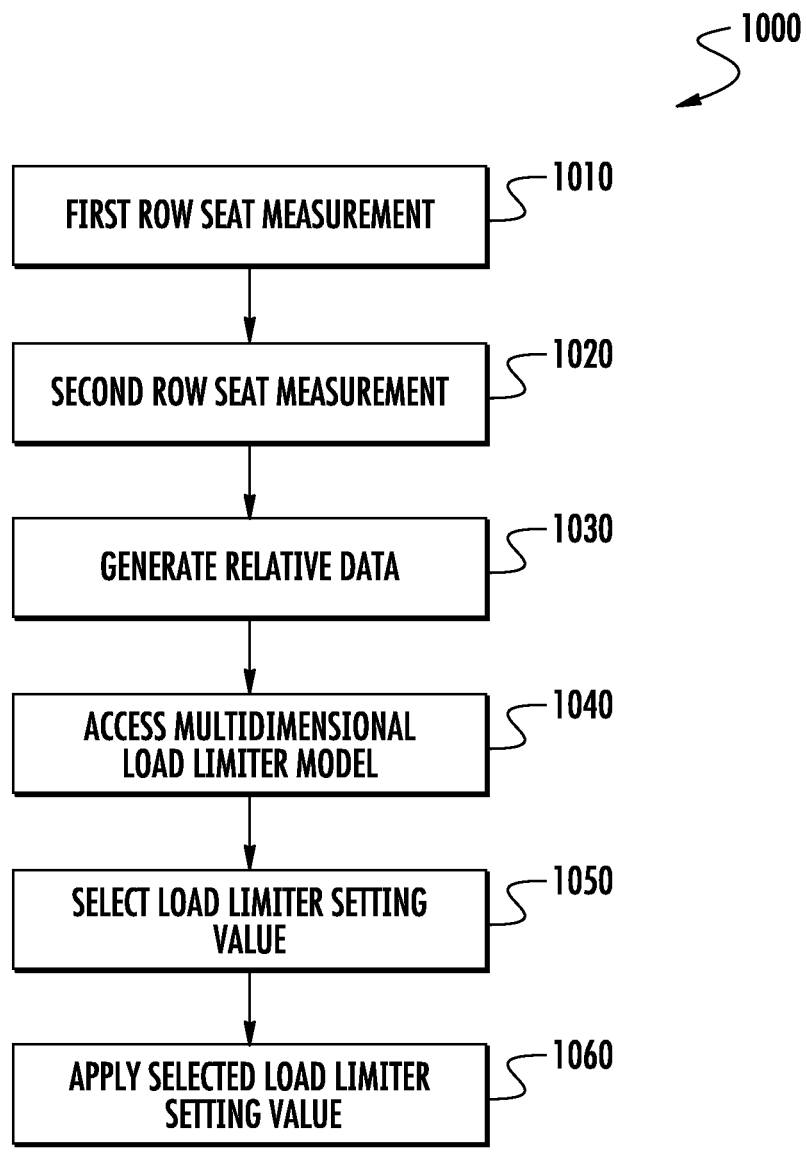
FIG. 10 shows an example of a method.

FIG. 10 shows an example of a method 1000. The method can be performed using equipment in any or all implementations described herein. In some implementations, a processor-based system in the seat 800 (FIG. 8) can perform some or all operations. For example, the operations can be implemented in the seat system control module 803 (FIG. 8).

At 1010, a first row seat measurement is performed. In some implementations, this can involve determining a seat value for a first row seat. For example, this can be accomplished using a first seat sensor on the first row seat. Any kind of seat value can be determined, including, but not limited to, a fore/aft value regarding seat position on a track.

At 1020, a second row seat measurement is performed. In some implementations, this can involve determining a seat value for a second row seat. For example, this can be accomplished using a second seat sensor on the second row seat. Any kind of seat value can be determined, including, but not limited to, a fore/aft value regarding seat position on a track.

At 1030, relative position data is generated. In some implementations, this is relative position data for the first and second row seats that is generated using the first and second row seat values. For example, a relative seat distance value reflecting the current separation of the seats, taking into account any or all seat adjustment signals regarding the seats that may be available in the system, can be generated.

At 1040, a multidimensional load limiter model can be accessed using the relative position data. In some implementations, the model associates load limiter setting values with respective occupant weight values and/or relative seat position data. The multidimensional load limiter model can include at least i) body impact values as a function of at least load limiter setting values and as a function of relative position values, and ii) restraint interaction values as a function of at least the load limiter setting values and as a function of the relative position values. For example, the model can be accessed in real time when new occupant weight sensor data and/or new relative position data regarding the seats becomes available.

At 1050, a load limiter setting value can be selected. In some implementations, the load limiter setting value is selected using the multidimensional load limiter model. For example, the load limiter setting value can be selected so that the load limiter setting value is outside a first value avoidance zone defined for the body impact values, and outside a second value avoidance zone for the restraint interaction values.

At 1060, a second row restraint system in the vehicle can be configured with the selected load limiter setting value. For example, a load limiter can be set so that seatbelt webbing payout occurs at an applied load of approximately L kN, where L is the value obtained by choosing a particular one of multiple load limiters covered by the multidimensional load limiter model.

More or fewer operations can be performed in some implementations. Two or more operations can be performed in a different order.

A number of implementations have been described as examples. Nevertheless, other implementations are covered by the following claims.

What is claimed is:

1. A method of configuring a load limiter in a second row of a vehicle where each of a first row seat and a second row seat is fore/aft adjustable, the method comprising:
   determining a first row seat value using a first seat sensor on the first row seat;
   determining a second row seat value using a second seat sensor on the second row seat;
   generating relative position data for the first and second row seats using the first and second row seat values;
   selecting a load limiter setting value using the relative position data, the load limiter setting value selected using a multidimensional load limiter model including at least i) body impact values as a function of at least load limiter setting values and as a function of relative position values, and ii) restraint interaction values as a function of at least the load limiter setting values and as a function of the relative position values, the load limiter setting value selected so that the load limiter setting value is outside a first value avoidance zone defined for the body impact values, and outside a second value avoidance zone for the restraint interaction values; and
   configuring a second row restraint system in the vehicle with the selected load limiter setting value.

2. The method of claim 1, wherein the multidimensional load limiter model also depends on occupant weight, the method further comprising determining an occupant weight value for an occupant in the second row seat, and taking into account the occupant weight value in selecting the load limiter setting value.

3. The method of claim 2, wherein the multidimensional load limiter model depends on occupant weight categories, the method further comprising determining which of the occupant weight categories comprises the occupant weight value.

4. The method of claim 3, wherein the occupant weight categories include corresponding percentile values relative to a reference population.

5. The method of claim 1, wherein the load limiter setting value includes a force value, and wherein configuring the second row restraint system comprises setting a load limiter therein to perform belt payout when a force on the second row restraint system is approximately equal to the force value.

6. The method of claim 1, wherein the first row seat value includes a first fore/aft position value.

7. The method of claim 6, wherein the second row seat value includes a second fore/aft position value.

8. The method of claim 1, wherein at least one of the first and second row seat values includes a lift height value.

9. The method of claim 1, wherein at least one of the first and second row seat values includes a back recline position value.

10. The method of claim 1, wherein at least one of the first and second row seat values includes a tilt position value.

11. The method of claim 1, wherein at least one of the first and second row seat values includes a pitch position value.

12. The method of claim 11, wherein the pitch position value is for the second row seat in its entirety and whether a backrest of the second row seat is non-reclining.

13. The method of claim 1, wherein at least one of the first and second row seat values includes a lumbar support value.

14. The method of claim 13, wherein the lumbar support value reflects a lumbar support horizontal position.

15. The method of claim 13, wherein the lumbar support value reflects a lumbar support vertical position.

16. The method of claim 1, wherein at least one of the first and second row seat values includes a headrest position value.

17. The method of claim 1, wherein the first value avoidance zone comprises the body impact values being above a limit.

18. The method of claim 17, wherein the first value avoidance zone further comprises the body impact values indicating expected body contact with the first row seat.

19. The method of claim 1, wherein the second value avoidance zone comprises the restraint interaction values being above a limit.

20. The method of claim 1, wherein the multidimensional load limiter model takes into account crash severity, and wherein a crash severity value is used in selecting the load limiter setting value.

\* \* \* \* \*